United States Patent [19]

Alexander

[11] 4,254,687

[45] Mar. 10, 1981

[54] FLOW CONTROL VALVE

[75] Inventor: Frank N. Alexander, Hutchinson, Kans.

[73] Assignee: The Cessna Aircraft Company, Wichita, Kans.

[21] Appl. No.: 87,853

[22] Filed: Oct. 24, 1979

[51] Int. Cl.[3] .............................................. G05D 11/13

[52] U.S. Cl. ......................................... 91/29; 137/110; 91/468

[58] Field of Search ....................... 137/109, 110; 91/6, 91/31, 461, 29, 468; 251/30

[56] References Cited

U.S. PATENT DOCUMENTS

| | | | |
|---|---|---|---|
| 2,391,930 | 1/1946 | Stone | 91/29 |
| 2,707,021 | 4/1955 | Harris | 137/110 |
| 2,891,517 | 6/1959 | Towler et al. | 91/468 |
| 3,424,057 | 1/1969 | Schweizer | 91/29 |
| 3,625,007 | 12/1971 | Herndon, Jr. | 91/29 |
| 3,693,506 | 9/1972 | McMillen et al. | 137/115 |
| 3,744,517 | 7/1973 | Budzich | 137/596.2 |
| 3,771,558 | 11/1973 | Ailshie | 137/596.13 |
| 3,815,477 | 6/1974 | Ailshie et al. | 137/596.12 |
| 3,905,383 | 9/1975 | Schwerin | 137/110 |
| 3,979,908 | 9/1976 | Alderson | 60/422 |

*Primary Examiner*—Martin P. Schwadron
*Assistant Examiner*—H. Jay Spiegel

[57] ABSTRACT

A solenoid powered flow control valve in which the valve spool has split the pump flow across a primary metering orifice and a pilot metering orifice which regardless of spool position maintains a substantially constant flow ratio between the main and pilot flow. The valve spool is controlled by opposing servo chambers which sense the pressure drop in the pilot flow path across a solenoid powered variable orifice.

7 Claims, 2 Drawing Figures

FLOW CONTROL VALVE

BACKGROUND OF THE INVENTION

Hydraulic systems on modern construction and other types of mobile equipment have a widely changing flow and load requirements. In some of these systems, a fairly recent concept called "pressure compensation" has been adopted. The basic component of such a system is a pressure compensated flow regulator. This device allows a precise controlled flow to a motor or actuator regardless of the load. The benefits of this controlled flow become most apparent where conditions cause a wide variance in pressures, either upstream or downstream, of the control. The control is accomplished by means of a pressure compensator plunger positioned by servo chambers at opposite ends of the plunger which sense a pressure drop across an orifice in series with the plunger in the controlled circuit and maintain a constant flow across that orifice. Any time the flow across that orifice exceeds the desired level, the pressure drop increases and is sensed on one end of the plunger causing it to automatically throttle-down its flow so as to supply only the fluid necessary to maintain the required pressure drop.

More recently this feature has been incorporated into adjustable flow regulators and also directional control valves in several manners to achieve many different benefits. Examples of these type of systems are shown in U.S. Pat. No. 3,979,908, No. 3,815,477, No. 3,771,558, No. 3,744,517 and No. 3,693,506.

DESCRIPTION OF THE INVENTION

In a conventional control valve, utilizing a flow control of the type just mentioned, the control valve is quite often soleniod powered, and the size of the solenoid must be substantial since it must be capable of handling the entire rated flow that the valve handles. Since the solenoid cost is a major expense, any reduction in solenoid size provides a more economical system. The flow control spool of the present invention splits the pump flow into two parallel paths, and controls both flows at a constant ratio to each other. The primary flow path handles a much greater flow than the pilot flow, as for example in a ratio of 20:1. The solenoid powered variable orifice which controls the valve spool is positioned in the pilot flow path and since the maximum flow in the pilot path is very small, only a small solenoid is required to control said flow.

It is therefore the principal object of the present invention to provide a solenoid powered variable flow control valve which is substantially reduced in size and cost.

Another object of the present invention is to provide a variable flow control valve which is controlled by pilot flow through the valve.

These and other important objects and advantages of the present invention are specifically set forth or will become apparent from the following detailed description of the preferred embodiments of the invention, when read in conjunction with the accompanying drawings wherein:

FIG. 1 is a partially schematic drawing showing the flow control valve in longitudinal section with the valve spool in a fully closed position; and FIG. 2 is a similar partially schematic view with the flow control valve spool in an open position and the control orifice also in an open position.

DETAILED DESCRIPTION OF THE PREFERRED EMBODIMENT

Figure 1:
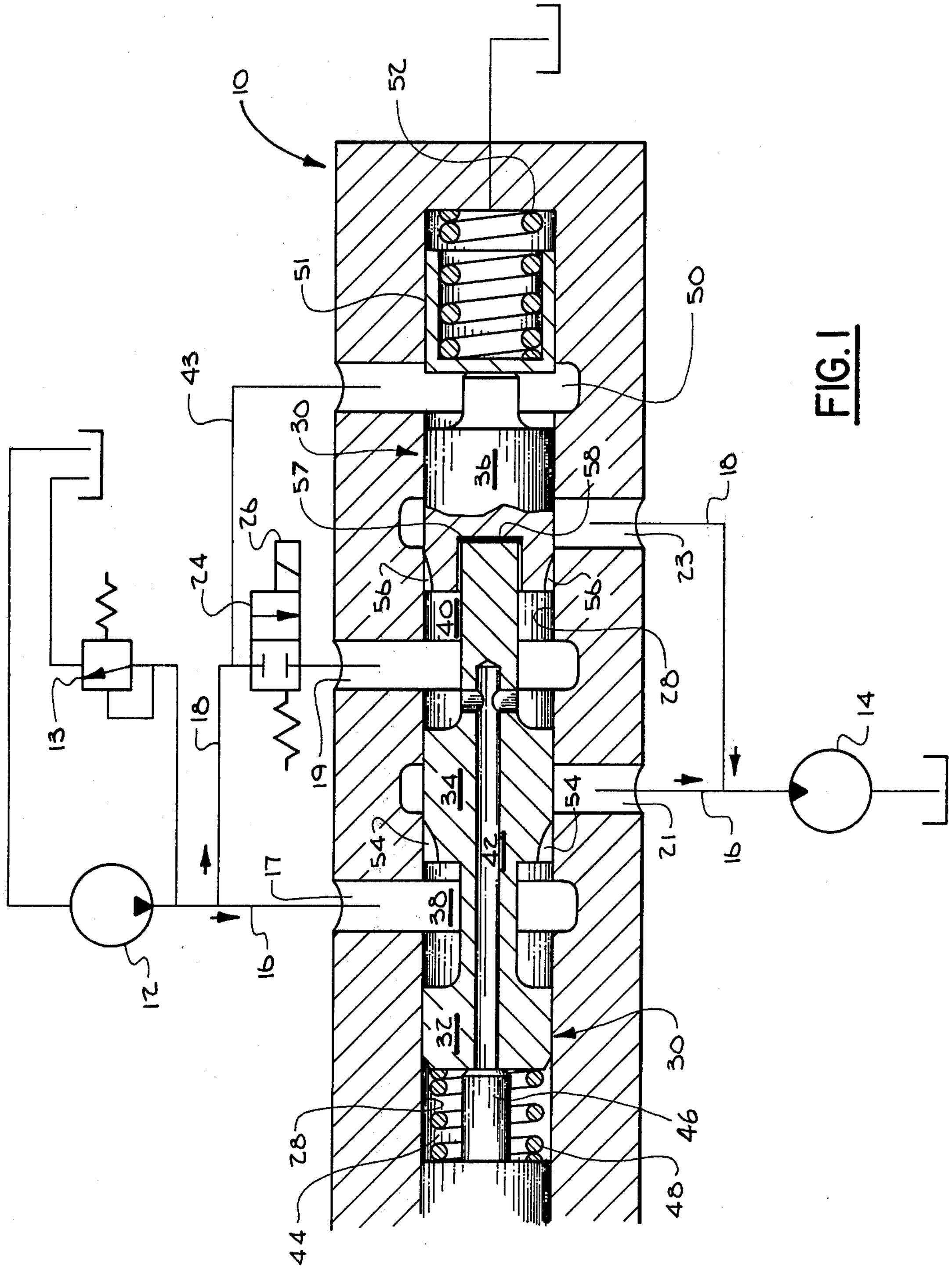
Figure 2:
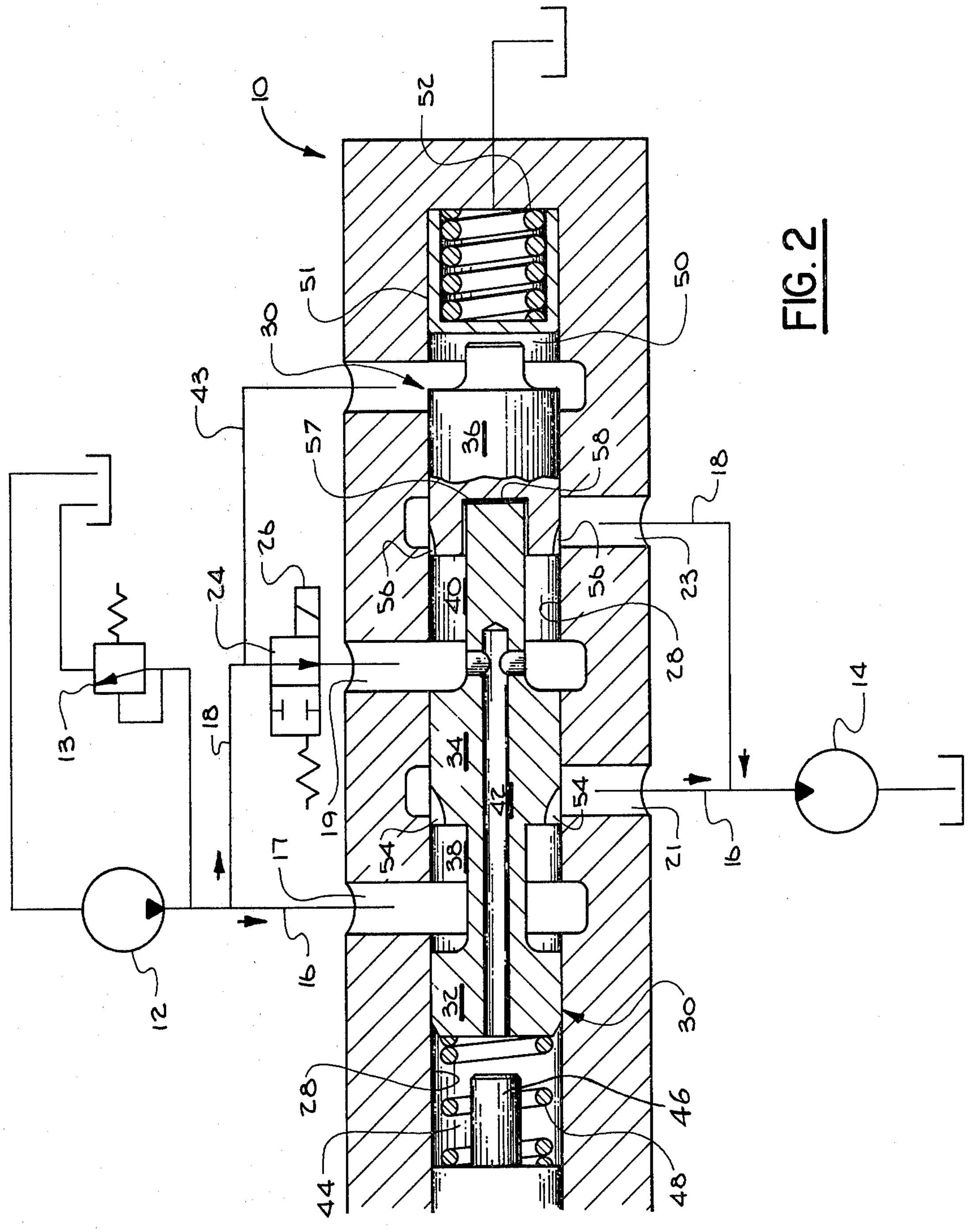

Turning now more particularly to FIG. 1, the flow control valve generally described by reference numeral 10 is shown positioned between pump 12 and motor 14. The flow from pump source 12 into flow control valve 10 is divided into a primary flow path 16 and a pilot flow path 18 which enter primary inlet port 17 and pilot inlet port 19, respectively. The primary flow path exits the control valve 10 through primary outlet port 21 while the pilot flow path exits through pilot outlet port 23. Downsteam of valve 10, the primary and pilot flow paths join before entering motor 14. Positioned in the pilot flow path upstream of control valve 10 is a variable orifice valve 24 spring-biased towards a closed position which is powered by soleniod 26.

Pump 12 is illustrated as a fixed displacement constant flow pump having a relief valve 13 returning the unused flow to reservoir, however, various other types of variable displacement flow or pressure compensated pumps could also be utilized with the flow control valve 10 of the present invention.

Located in control valve 10 is a valve bore 28 which contains a valve spool 30 slidably positioned therein. Spool 30 includes valve lands 32, 34 and 36 which define grooves 38 and 40 therebetween. Passing longitudinally down through the center of spool 30 is a passaage 42 which connects spool groove 40 with servo chamber 44 located at the left end of spool 30. Also located in servo chamber 44 is a spool limit stop 46 and a compression spring 48 urging valve spool 30 in a rightwardly direction. Located at the opposite end of spool 30 is servo chamber 50 which exerts pressure on the right end of valve spool 30 urging it in a leftwardly direction, as seen in the drawing. Also located in chamber 50 is a piston 51 urged in a leftwardly direction by spring 52 which has a greater spring force than spring 48.

Located on the left edge of valve spool land 34 are primary metering notches 54 which meter the primary flow across spool 30. Located on the left edge of valve spool land 36 are pilot metering notches 56 which meter the pilot flow across spool 30 into pilot outlet port 23. Notches 54 are sized with a flow area approximately twenty times greater than the flow area of pilot notches 56 and the notches 54 and 56 are longitudinally shaped and timed so that regardless of the spool position, the ratio of flow areas of 20:1, for example, will remain constant. Valve spool 30 includes two sections with the spool end 36 separating from the remainder of the spool and having a shimming cavity 57 located at the joining end so that shims 58 can be located therein to accurately set the timing between the primary and pilot notches 54 and 56. Notches 54 and 56 can be of a different type just so the ration of flow area between the two remains substantially constant at various spool positions. Actually, by deliberately allowing the ratio to deviate a small amount, some undesirable non-linear effects can be compensated for.

OPERATION

A typical application of the hydraulic system of the present invention would be a reel speed drive on a combine with motor 14 driving the reel at various speeds as determined by the opening or flow area of valve 24.

In FIG. 1 solenoid 26 is de-energized and valve 24 is in the fully closed position. Prior to the start up of pump 12, flow control spool 30 is in its fully closed position as indicated in FIG. 1 since the force of spring 52 is greater than that of spring 48. As pump 12 comes up to pressure, valve spool 30 remains in its fully closed position against limit stop 46 with pump pressure in servo chamber 50 urging the spool towards the left, as seen in the drawing, and piston 51 towards the right end of servo chamber 50. Since solenoid 26 is de-energized and valve 24 is fully closed, the left hand servo chamber 44 is at zero pressure.

FIG. 2

When the combine operator desires to start the reel motor 14, solenoid 26 is energized by an initial voltage, causing valve 24 to move to a partially open position allowing pump pressure into pilot inlet 19 which in turn exerts a pressure on the left hand end of valve spool 30 through spool passage 42. Spool 30 will initially move to the right towards an open position due to the force of spring 48, since the pressures in servo chambers 44 and 50 are the same. As spool 30 moves rightwardly, primary and pilot notches 54 and 56 begin to flow fluid to motor 14. As fluid begins to flow across valve 24, the pressure drop across valve 24 is felt in servo chambers 44 and 50 via sensing passages 42 and 43. When the pressure drop or Δp across valve 24 reaches the force of spring 48, valve spool 30 will shift leftwardly, thereby restricting the primary and pilot flow and maintaining a constant Δp across valve 24. If, for example, the load on motor 14 diminishes, the primary and pilot flow will attempt to increase; however, the increased flow across fixed restriction 24 will increase the pressure drop across that valve and cause the flow control spool 30 to shift leftwardly and maintain a constant flow across fixed restriction or valve 24. When valve 24 is opened further, which is caused by increasing the voltage to solenoid 26, flow control spool 30 will still maintain a constant pressure drop across valve 24 even though a higher flow rate is passing through valve 24. Likewise, if the load on motor 14 increases, and the pilot flow across valve 24 decreases, the drop in pressure across valve 24 will cause valve spool 30 to shift rightwardly opening primary and pilot notches 54 and 56 until the flow rate is returned to its previous level.

Whenever there is flow in the primary and pilot flow paths, the flow will always be divided in approximately the same ratio which, for example, in the present illustration is 20:1. This is so because the metering flow areas for the primary and pilot flows are machined to approximately maintain a fixed ratio at any spool position, and the pressure drops across the respective metering areas are about the same. The pressure drop across the pilot flow metering notch is actually lower by the amount of drop across the solenoid valve, but this drop is designed to be small, say 50 PSI, relative to the overall drop across the control valve, which might range from 300 to 3000 PSI. Therefore, the primary flow can accurately be controlled at any valve setting by controlling the pilot flow. The purpose of piston 51 is merely to insure the flow control spool 30 will be in a closed position when the pump 12 is initially started. Once pump 12 comes up to pressure, piston 51 will retract in servo chamber 50 and spring 52 will no longer exert a force on spool 30, as long as pump pressure is maintained in the system.

The detailed description of preferred embodiments set forth is exemplary in nature and is not to be considered as limiting to the scope and spirit of the invention as set forth in the accompanying claims.

Having described the invention with sufficient clarity to enable those skilled in the art to make and use it, what is claimed as new and desired to be secured by Letters Patent is:

1. In a flow controlled hydraulic circuit having a pump source supplying a motor under changing loads, the improvement comprises a flow control valve positioned between the pump and motor including:

a valve body;

a bore in the body;

a valve spool in the bore spring-biased in one direction;

a primary flow path across the valve spool and a pilot flow path across the spool, the pilot flow path is connected in parallel with the primary path at a point upstream of the valve spool with a point downstream of the spool;

primary valving means on the valve spool in the primary path providing a variable flow area across the spool at different spool positions;

pilot valve means on the valve spool in the pilot path providing a variable flow area across the spool which is substantially proportional to the flow area of the primary means at different spool settings;

control servo chambers at opposite ends of said spool for positioning the spool;

a solenoid powered variable orifice means positioned in the pilot flow path for controlling the flow control valve; and sensing passage means sensing the pressure drop across the variable orifice means and connected to the two servo chambers whereby the valve spool is positioned so that a constant pressure drop is maintained across the variable orifice regardless of motor load or rate of flow.

2. A flow controlled circuit as set forth in claim 1, including biasing means on the valve spool urging the spool towards an open position and the passage means includes a first sensing passage connecting the pressure downstream of the variable orifice means with a first servo chamber urging the spool towards an open position and a second sensing passage connecting the pressure upstream of the variable orifice means with the second servo chamber urging the spool towards a closed position.

3. A flow controlled circuit as set forth in claim 1, including biasing means on the valve spool urging the spool towards an open position and the passage means includes a first sensing passage connecting the pressure downstream of the variable orifice means with a first servo chamber urging the spool towards an open position and a second sensing passage connecting the pressure upstream of the variable orifice means with the second servo chamber urging the spool towards a closed position, and the variable orifice means is positioned in the pilot flow path upstream of the primary and pilot valving means.

4. A flow controlled circuit as set forth in claim 1, including biasing means on the valve spool urging the spool towards an open position and the passage means includes a first sensing passage connecting the pressure downstream of the variable orifice means with a first servo chamber urging the spool towards an open position and a second sensing passage connecting the pressure upstream of the variable orifice means with the second servo chamber urging the spool towards a closed position; a spring-biased piston in the second servo chamber urging the spool towards a closed position when there is no pressure in the second chamber, the spring-biased piston having a greater force than the biasing means.

5. A flow controlled circuit as set forth in claim 1, wherein the primary and pilot valving means includes adjacent inlet and outlet cavities intersecting the valve bore with primary and pilot valve spool lands positioned between the cavities blocking flow thereacross and metering notches in each primary and pilot spool land, the notches being shaped and sized to have a constant ratio of flow areas regardless of the spool position.

6. A flow controlled circuit as set forth in claim 1, wherein the valve spool includes two sections with a shimming space therebetween so that timing of flow areas between the primary and pilot valving means can be adjusted.

7. A flow controlled circuit as set forth in claim 1, wherein the valve spool includes two sections with a shimming cavity therebetween so that timing of flow areas between the primary and pilot valving means can be adjusted, and the primary and pilot valving means includes adjacent inlet and outlet cavities intersecting the valve bore with primary and pilot valve spool lands positioned between the cavities blocking flow thereacross and metering notches in each primary and pilot spool land, the notches being shaped and sized to have a constant ratio of flow areas regardless of the spool position.

* * * * *